United States Patent [19]
Bennett et al.

[11] Patent Number: 5,221,728
[45] Date of Patent: Jun. 22, 1993

[54] FILM OF AN AROMATIC POLYETHERKETONE SUITABLE FOR FURTHER THERMOPLASTIC PROCESSING

[75] Inventors: Cynthia Bennett, Wiesbaden; Werner Roth, Eppstein, both of Fed. Rep. of Germany

[73] Assignee: Hoechst Aktiengesellschaft, Frankfurt am Main, Fed. Rep. of Germany

[21] Appl. No.: 684,770

[22] Filed: Apr. 15, 1991

[30] Foreign Application Priority Data

Apr. 20, 1990 [DE] Fed. Rep. of Germany ....... 4012589

[51] Int. Cl.$^5$ ............................................... C08G 8/02
[52] U.S. Cl. .................................. 528/125; 528/126; 528/128; 528/480; 528/491
[58] Field of Search ............... 528/125, 126, 128, 480, 528/491

[56] References Cited

U.S. PATENT DOCUMENTS

| | | | |
|---|---|---|---|
| 3,065,205 | 11/1962 | Bonner, Jr. | 528/174 |
| 3,809,682 | 5/1974 | Studinka et al. | 528/180 |
| 4,897,307 | 1/1990 | Beck et al. | 428/398 |
| 5,057,600 | 10/1991 | Beck et al. | 528/480 |

FOREIGN PATENT DOCUMENTS

| | | |
|---|---|---|
| 0176989 | 4/1986 | European Pat. Off. . |
| 0193187 | 9/1986 | European Pat. Off. . |
| 0195448 | 9/1986 | European Pat. Off. . |
| 0211693 | 2/1987 | European Pat. Off. . |
| 0322609 | 7/1989 | European Pat. Off. . |
| 3901072 | 7/1990 | Fed. Rep. of Germany . |

OTHER PUBLICATIONS

Research Disclosure 21601 (1982) Production of Oriented Films of Aromatic Polysetherketones pp. 103 and 104.
Research Disclosure 20216 (1981) Oriented Films and Fibres of Aromatic Polyetherketones p. 73.
ICI Data Sheet Stabar'k Dec. 1984.

Primary Examiner—John Kight, III
Assistant Examiner—Shelley A. Wright
Attorney, Agent, or Firm—Foley & Lardner

[57] ABSTRACT

The invention describes a film of a thermoplastic, wholly aromatic polyetherketone. The film is amorphous and comprises the polymer PEEKK which is formed of the following repeat unit:

—[—Ph—O—Ph—O—Ph—CO—Ph—CO—]— wherein Ph denotes a para-phenylene group.

16 Claims, 2 Drawing Sheets

THERMOPLASTIC BEHAVIOUR OF AMORPHOUS PEEKK- AND PEEK-FILMS
RELATIONSHIP BETWEEN TEMPERATURE AND FORCE AT ELONGATION FACTOR 3
ELONGATION IN A HEATED CHAMBER USING A TENSILE TESTER

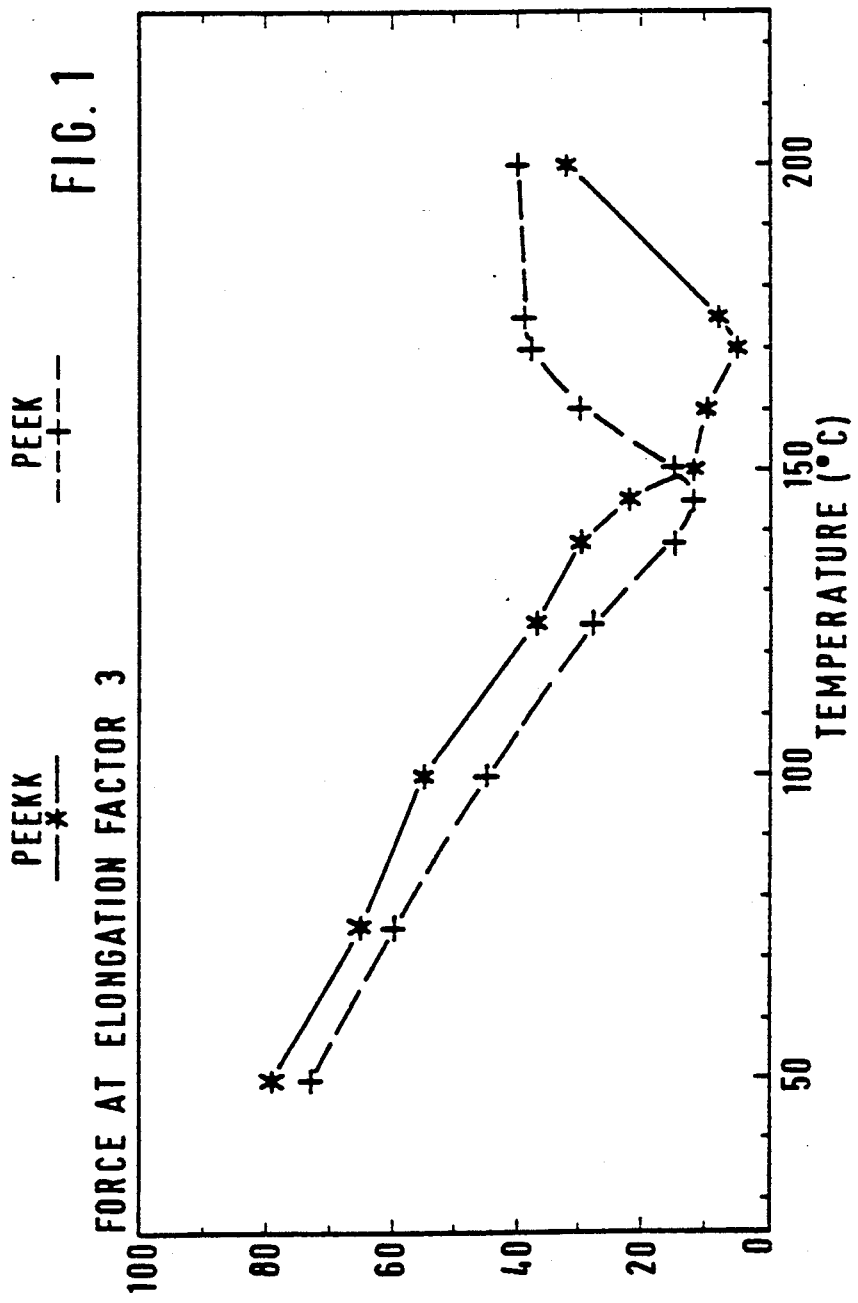

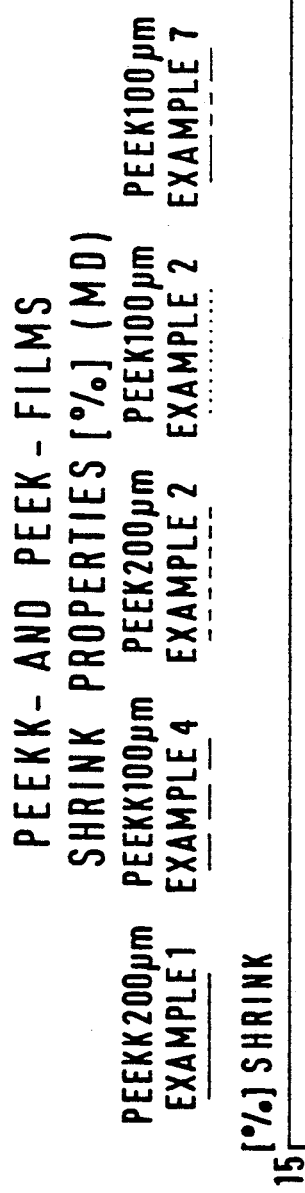

FILM OF AN AROMATIC POLYETHERKETONE SUITABLE FOR FURTHER THERMOPLASTIC PROCESSING

The present invention relates to a film of a thermoplastic, wholly aromatic polyetherketone.

It is known that wholly aromatic para-linked polyetherketones are particularly heat-resistant semi-crystalline polymer materials which can be prepared either by Friedel-Crafts-acylation of aromatic ethers (U.S. Pat. No. 3,065,205) or by nucleophilic condensation of phenolates with aromatic halides (DE-A-22 20 079).

The class of polyetherketones in general is particularly well known for its exceptionally high heat resistance, in combination with satisfactory thermoplastic processing characteristics. Moreover, polyetherketones generally have excellent resistance to the action of chemicals and to hydrolysis and they also show outstanding mechanical strength and toughness as well as dimensional stability. For these reasons, aromatic polyetherketones are among the materials which are particularly preferred by experts for technical applications.

As the nomenclature of the class of polyetherketones the following system has become generally accepted:
  P denotes a polymer
  E denotes a para-phenoxy unit
  K denotes a para-phenylketo unit According to this system the abbreviation PEEK thus stands for a polymer comprising repeat units of the following formula:

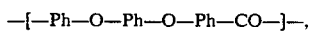
—[—Ph—O—Ph—O—Ph—CO—]—, in which the Ph group represents a para-phenylene group.

Research Disclosure 21601 (1982) has already disclosed heat-resistant films of the polymer PEEK, but these films are primarily in an oriented, crystalline form. Research Disclosure 20216 (1981), which deals with biaxially oriented and heat-set films of PEEK, also mentions other polyetherketone materials, such as, PEK, PEEKK and PEKEKK, but does not describe films made of these polymers.

The known oriented, crystalline films of aromatic polyetherketones have the disadvantage that thermoplastic processing of these films is considerably limited by the orientation and the high crystallinity of the polymers.

Non-oriented, amorphous films of the polymer PEEK have also been described (cf. ICI data sheet of December, 1984, referring to 'STABAR K' polyetherketone film). These films have, however, the disadvantage that hardening or embrittlement of the polymer occurs relatively quickly when the films are heated to 160° C. In addition, changes of electrical properties and other properties are clearly observed at temperatures above about 140° C.

SUMMARY OF THE INVENTION

Accordingly, it is an object of the present invention to provide a film which is particularly suitable for processing by thermoplastic molding methods, but which, nevertheless, does not show any tendency to harden or embrittle at temperatures of up to about 160° C.

Another object of the present invention is to provide a film showing an improved constancy of its electrical properties and other properties up to temperatures of about 155° C.

A further object of the present invention is to provide improved molding and electrical insulating materials comprising the foregoing improved film.

In accomplishing the foregoing objectives, there has been provided, in accordance with one aspect of the present invention, a film of a thermoplastic, wholly aromatic polyetherketone, which is amorphous and comprises the polymer PEEKK which is formed of the following repeat unit:

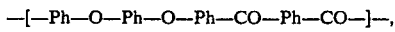
—[—Ph—O—Ph—O—Ph—CO—Ph—CO—]—, in which the Ph group denotes a para-phenylene group.

In accordance with another aspect of the present invention there is provided a process for producing a molded article which comprises the steps of: providing a film as described above; heating the film to a temperature sufficient for molding; and molding the film to produce a molded article. In a preferred embodiment, the process further comprises the step of cooling the article at a rate sufficient to retain the amorphous state of the film, whereby an amorphous molded article is produced. In another preferred embodiment, the process further comprises the step of maintaining the article at a temperature above about 170° C. for a time sufficient to convert the amorphous state of the film to a crystalline state, whereby a crystalline molded article is produced.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWING

The invention may be more readily understood by referring to the accompanying drawing by which FIG. 1 is a graph of the relation between temperature and the force required for elongation by a factor of 3 for PEEKK films according to the invention and PEEK films, and FIG. 2 is a graph of the relation between shrink percentage and temperature for PEEKK film according to the invention and PEEK films.

DETAILED DESCRIPTION OF THE PREFERRED EMBODIMENTS

Within the scope of the present invention, the term "amorphous" means that the film, in the broadest sense, can be converted thermoplastically under appropriate process conditions, according to techniques customarily employed in processing plastics, for example thermoforming, welding, sealing, pressing, stretching, embossing, bending, etc., to give high-quality fabricated technical products. First, the feature "amorphous" is explained in detail with reference to FIG. 1.

In FIG. 1, the force required to extend a film to three times its original length is plotted against the temperature applied in the extension process. As can be seen, the PEEKK film according to the invention retains a higher degree of strength when temperature is increased, i.e. at a given temperature of up to about 150° C., the force which must be applied to mold the film is invariably higher than in the case of a PEEK film. Nevertheless, it is surprisingly found that the PEEKK film can be thermoplastically molded more readily than a PEEK film. Above about 145° C. the molding force required for the PEEK film rises sharply, whereas the force required to mold the PEEKK film of the invention decreases further until a temperature of 170° C. is reached and, in general, lower molding forces can be applied over a wider temperature interval. The molding force required for PEEKK films does also rise again at still higher temperature, but the low-force temperature range of PEEKK films exceeds that of PEEK films by about 20° C.

Unexpectedly, not only are higher temperatures required to initiate the hardening and relative embrittlement, but, what is more, the films can undergo further thermoplastic processing over a particularly wide temperature interval (wider processing window). In addition, the electrical properties of the film show a better constancy up to about 155° C. and the dimensional stability and strength of the films are also improved.

In the following, the above-indicated properties are discussed in detail.

A PEEKK film according to the present invention must be essentially amorphous to permit thermoplastic processing, since once the polymer has crystallized it is no longer readily moldable. There are various methods of assessing the degree of crystallinity of polyetherketones. The most reliable method is wide-angle X-ray diffraction using $CuK_\alpha$ radiation. If an investigation according to this method shows a broad diffraction maximum instead of sharp diffraction reflexes, the sample examined is amorphous. However, for use as a routine method of investigation X-ray diffraction is relatively tedious. It is therefore customary in practice to determine the degree of crystallinity by way of a density measurement. The amorphous PEEKK polymer has a density in the range from 1.26 to 1.27 g/cm$^3$. Samples which have a higher density are crystalline. In addition, the crystalline state can be readily perceived visually, because crystalline, non-oriented samples of PEEKK appear opaque to the eye due to light-scattering effects on the crystallites' boundaries. But since even small amounts of additives can easily also produce opacity, a density of <1.28 g/cm$^3$ is most advantageously used as a simple test criterion of the amorphous state.

The molded articles prepared by thermoplastic processing of the amorphous PEEKK film of the present invention may themselves be either amorphous or crystalline. For example, if a molded article is to be transparent, it is advantageous to maintain its amorphous state. The amorphous state is best retained by cooling the molding to room temperature as quickly as possible after molding at the necessary raised temperature. If, on the other hand, a molded article is to be prepared which exhibits minimal distortion at higher temperatures up to above 160° C., a crystalline embodiment is favorable. The crystalline state is achieved by maintaining the molded article in the mold after the molding step for some time at temperatures above about 170° C. Since it is not intended to subject a molded article of this kind to a further molding step, the relative hardening or embrittlement observed in crystalline films does not have an adverse influence on this molded article. Crystallinity rather has the advantageous effect of producing a higher initial strength.

To measure the dimensional stability of a film, a film sample of given length is kept tension-free in a circulating air oven for a period of 10 minutes. Generally, any thermoplastic film will lose its dimensional stability above some particular temperature. The film first softens and turns wavy and finally shrinks. This shrinkage constitutes a permanent dimensional change. The temperature which triggers this shrinking process is markedly higher (160° C.) in PEEKK films than in PEEK films ($\leq$140° C.). Exact values are given in the examples and are, in particular, shown in FIG. 2.

Just like dimensional stability, the other properties of the PEEKK film of the present invention remain unchanged up to temperatures which are higher than in the case of PEEK films. These properties include, for example, the dielectric loss factor and the relative dielectric contant. In PEEKK the two parameters remain constant up to higher temperatures.

PEEKK films can be produced according to conventional melt molding methods such as compression molding, etc. A particularly suitable process is melt extrusion through a slot die. Rapid cooling of the melt after withdrawal from the die is very important to prevent crystallization. Various cooling methods can be employed for this purpose such as, for example, introducing the melt into a cooling bath, blowing air against the melt or spraying the melt with a cooling medium. A technically convenient cooling method is to extrude the melt onto a rotating drum kept at a particular temperature (between about 40° and 130° C.). In the process, the use of special pressing techniques such as electrostatic pinning by means of a pinning wire to which high voltage is applied, air knives or drum wetting can be advantageous. These techniques can help to ensure good contact with the cooling drum and removal of heat.

PEEKK which is suitable for use in the fabrication of amorphous films is industrially prepared and marketed. PEEKK films according to the present invention can contain appropriate amounts of additives such as processing aids, winding aids (pigments), stabilizers or color pigments. The film can also contain lubricants such as calcium stearate, PTFE waxes or polydiorganosiloxanes in amounts of 0 to about 2% by weight, preferably about 0.1 to 1.5% by weight.

PEEKK which can be used for melt processing into an amorphous film has a melt flow index between about 1 and 1000, preferably between about 10 and 200. The melt flow index or MFI of polyetherketone is determined at 400° C. and is specified in g/10 minutes at a load of 49 N (DIN 53 735). PEEKK with a very low melt flow index (high viscosity) cannot be readily extruded, whereas PEEKK with a very high melt flow index has insufficient melt strength.

The following test methods were used to determine film properties:

Melt flow indices (MFI) were determined at 400° C. using a load of 49 N and hole diameters of 2.1 mm and 8 mm and are indicated in g/10 min (DIN 63 735).

Densities were determined in accordance with ASTM D 1505-68 by immersing samples into density gradient columns. For preparing the density gradient columns mixtures of $CCl_4$/heptane or aqueous $ZnCl_2$ solutions were used.

To determine mechanical properties, tensile tests were carried out on film strips of 100 mm $\times$ 15 mm. The modulus of elasticity was determined at an extension rate of 1%/min, between 0.4 and 0.6% elongation. Tensile strength at break and elongation at break were measured at an extension rate of 100%/min.

Thermal shrinkage was determined on film squares of 10 cm side length. After 10 minutes in a circulating air oven at the temperature specified, in each case the samples were removed and measured exactly at room temperature.

Suitability for thermoplastic processing was examined by tensile testing at elevated temperature. Film samples of 15 mm×50 mm were extended at a rate of 100%/min in a heated chamber and the force occurring at threefold extension (corresponding to 200% elongation) was measured.

The electrical properties (dielectric loss factor, volume resistivity and relative dielectric constant) were determined in accordance with VDE-Standard 0303, at 23° C. and 50% relative humidity.

The glass transition temperature ($T_g$) was determined as the abrupt rise in heat capacity in the DSC diagram.

EXAMPLE 1

PEEKK containing additives of 0.1% by weight of triphenylphosphate, 0.1% by weight of IRGAFOS 168, 0.5% by weight of IRGANOX 1425 (commercial products of Ciba-Geigy) as stabilizers and 0.1% by weight of HOSTAFLON TF 9202 (a PTFE wax manufactured by HOECHST AG) as a lubricant and having a melt flow index of 12 g/10 min was melted in a single-screw extruder at temperatures of 370° C. to 385° C. and then extruded through a slot die onto a cooling drum kept at a temperature of 60° C. A 200 μm thick film was obtained which was light yellow, tough and transparent. The film had a density of 1.27 g/cm³. The mechanical properties were as follows:

| modulus of elasticity: | 2.5 GPa |
| tensile strength at break: | 107 MPa |
| elongation at break: | 176% |

Shrinkage at 150° C. was 0.1% both in the longitudinal and transverse directions.

EXAMPLE 2 (COMPARATIVE EXAMPLE)

Commercial PEEK (VICTREX PEEK 450 G manufactured by ICI) was melted in the same extruder at temperatures of 335° C. to 385° C. and extruded through a slot die onto the cooling drum. Films having thicknesses of 100 μm and 200 μm were produced which were brown, transparent and tough. The films had a density of 1.26 g/cm³ and a Tg of 145° C. The mechanical properties were as follows:

| modulus of elasticity: | 2.4 GPa |
| tensile strength at break: | 88 MPa |
| elongation at break: | 156% |

The shrinkage at 150° C. was 2.5% in machine direction and 0.7% in the transverse direction.

EXAMPLE 3

PEEKK with additives of 0.1% by weight of triphenylphosphate, 0.1% by weight of IRGAFOS 168 (Ciba-Geigy) and 0.1% by weight of HOSTAFLON TF 9202 (HOECHST AG) and having a melt flow index of 14 g/10 min was processed as described in Example 1 to give a 280 μm thick film. The film was tough and transparent and had a brown color. Density of the film was 1.26 g/cm³ and wide-angle X-ray diffraction showed a broad, diffuse diffraction maximum, which indicates a complete lack of crystallinity. The mechanical properties were as follows:

| modulus of elasticity: | 2.4 GPa |
| tensile strength at break: | 78 MPa |
| elongation at break: | 147% |

EXAMPLE 4

PEEKK with an addition of 0.3 % by weight of HOSTAFLON TF 9202 (HOECHST AG), which had a melt flow index of 16 g/10 min was extruded onto a cooling drum at temperatures of 370° to 400° C. The 100 μm and 200 μm thick films obtained had a density of 1.27 g/cm³. The films were brown, transparent and tough. The Tg of the films was 158° C.

The ease of thermal molding of this film was measured by a tensile test at elevated temperature. In this test, film strips were extended to three times their original length (corresponding to 200 % elongation) in a tensile testing machine equipped with a heat chamber and the intrinsic forces (i.e. absolute forces divided by the initial cross-sectional area of the sample) occurring in the process were registered. In FIG. 1 these forces are plotted as a function of measuring temperature. With increasing temperature, the PEEKK film first softens continuously. Above 170° C., i.e. about 12° C. above the glass transition temperature, the force required to extend the film increases again. The intrinsic force at threefold extension was below 20 MPa in a temperature range from 145° C. to 185° C.

EXAMPLE 5 (COMPARATIVE EXAMPLE)

The thermal molding ease of the PEEK film of Example 2 was tested according to the method used in Example 3. The results are also shown in FIG. 1.

The PEEK film initially softens continuously with rising temperature, similarly to the PEEKK film. Up to 150° C. the PEEK film has, however, a lower strength than the PEEKK film. Directly above the glass transition temperature of the PEEK polymer at 145° C. extension force rises again. As a result, the temperature range in which the force required for threefold extension is below 20 MPa is clearly narrower in PEEK than in PEEKK.

EXAMPLE 6

PEEKK containing additives of 0.2% by weight of IRGANOX 1222 (Ciba-Geigy), 0.1% by weight of IRGAFOS PEPQ (Ciba-Geigy) and 0.1% by weight of HOSTAFLON TF 9202 (HOECHST AG) and having a melt flow index of 17 g/10 min was melted in a single-screw extruder at temperatures of 370° C. to 390° C. and extruded through a slot die onto a cooling drum kept at a temperature of 75° C. A 200 μm thick film was obtained which was brown, tough and transparent. The film had a density of 1.27 g/cm³.

This film was tested for thermal stability by measuring the change of mechanical properties in a tensile tester after a two hour exposure to a temperature of 160° C. in lab oven. The measurement results are shown in Table I. Tensile strength at break and elongation at break are not impaired by heat treatment. On the contrary, these properties are even improved. During heat treatment no deformation of the film occurred.

EXAMPLE 7 (COMPARATIVE EXAMPLE)

A commercial amorphous 100 μm thick PEEK film (LITREX K from PCD) was heat-treated over a period of two hours, as in Example 5. In the course of heat-treatment the film became wavy. The change in mechanical properties is specified in Table I. As is seen, the PEEK film undergoes embrittlement caused by heat treatment

TABLE I

Change in mechanical properties of PEEKK and PEEK films due to heat treating for 2 hours at 160° C.

|  | PEEKK Example 6 | PEEK Example 7 |
| --- | --- | --- |
| remaining tensile strength at break (% of initial value) | 116 | 65 |
| remaining elongation at break (% of initial value) | 122 | 69 |

EXAMPLE 8

The dimensional stability of PEEKK films was tested by means of shrinkage measurements using the films from Examples 1 and 3. Film squares having a side length of 10 cm were placed for 10 minutes in a circulating air oven at different temperatures. Afterwards dimensional change in the extrusion direction was measured.

FIG. 2 shows the shrinkage of the PEEKK films as a function of temperature. As can be seen, thermal shrinkage does not set in until a temperature above 160° C. is reached.

EXAMPLE 9 (COMPARATIVE EXAMPLE)

The dimensional stability of PEEK films was determined according to the method of Example 8. For testing, the PEEK films of Example 2 and commercial PEEK films (cf. Example 7) were used. The results are also shown in FIG. 2. Thermal shrinkage of PEEK films begins at considerably lower temperatures: in the film of Example 2 at about 140° C. and in the commercial PEEK film at an even lower temperature.

EXAMPLE 10 (COMPARATIVE EXAMPLE)

The amorphous film of Example 6 was processed into a crystalline PEEKK film and the mechanical properties of this film were compared to those of the amorphous film. A piece of the amorphous film was clamped in a metal frame and placed for 10 seconds in a circulating air oven at 275° C. As a result of heat treatment the film crystallized, which became evident by an increase in density to 1.29 g/cm$^3$ and opacity of the film. Measurement of mechanical properties on the amorphous film and the crystalline film showed that the crystalline film was somewhat more brittle:

|  | amorphous PEEKK film | crystalline PEEKK film |
| --- | --- | --- |
| density (g/cm$^3$) | 1.27 | 1.29 |
| modulus of elasticity (GPa) | 2.4 | 2.6 |
| force at 5% elongation (MPa) | 72 | 82 |
| tensile strength at break (MPa) | 89 | 66 |
| elongation at break (%) | 147 | 30 |

EXAMPLE 11

Two layers of the amorphous PEEKK film of Example 3 were welded together using a film sealing apparatus manufactured by Walter Tantz (Berlin). (The apparatus settings required were: pressure applying period "6", operating speed "6", heat "11" and time "10".)

Using these apparatus settings, it was impossible to weld the crystalline PEEKK film of Example 10.

EXAMPLE 12

PEEKK containing additives of 0.2% by weight of IRGANOX 1222 (Ciba-Geigy), 0.1% by weight of IRGAFOS PEPQ (Ciba-Geigy) and 0.1% by weight of HOSTAFLON TF 9202 (HOECHST AG) and having a melt flow index of 107 g/10 min was processed as in Example 1, at temperatures of 330° C. to 380° C., to give a 200 μm thick film. The film obtained was glossy, brown, tough and transparent. The mechanical properties of the film were as follows:

| modulus of elasticity: | 2.6 GPa |
| --- | --- |
| tensile strength at break: | 82 MPa |
| elongation at break: | 144% |

EXAMPLE 13

PEEKK containing the same additives as in Example 12 and having a melt flow index of 45 g/10 min was extruded into a film as in Example 10. The 100 μm thick film was brown, tough and transparent. The mechanical properties of the film were as follows:

| modulus of elasticity: | 2.6 GPa |
| --- | --- |
| tensile strength at break: | 119 MPa |
| elongation at break: | 194% |

EXAMPLE 14

Two pieces of the PEEKK film of Example 3, 20×20 cm in size, were pressed together over a period of 5 minutes and under a pressure of 50 kp in a plate press heated at 300° C. After the pressing operation the film pieces were bonded to one another.

EXAMPLE 15

Silver was vacuum deposited on both surfaces of the PEEKK film of Example 1 and the electrical properties were determined at 25° C., 100° C. and 150° C. (see Table II).

EXAMPLE 16 (COMPARATIVE EXAMPLE)

The electrical properties of the PEEK film of Example 2 were determined as described in Example 15. The measurement results are given in Table II. It is found that, compared to the PEEKK film, the PEEK film exhibits a poorer constancy of the dielectric loss factor over a temperature range from 25° C. to 150° C.

TABLE II

Electrical properties of PEEKK and PEEK films

|  | temp. °C. | PEEKK (Ex. 15) | PEEK (Ex. 16) |
| --- | --- | --- | --- |
| dielectric loss factor | 25 | $1 \times 10^{-3}$ | $2 \times 10^{-3}$ |
|  | 100 | $1 \times 10^{-3}$ | $1 \times 10^{-3}$ |
|  | 150 | $1 \times 10^{-3}$ | $9 \times 10^{-3}$ |

TABLE II-continued

Electrical properties of PEEKK and PEEK films

|  | temp. °C. | PEEKK (Ex. 15) | PEEK (Ex. 16) |
|---|---|---|---|
| volume resistivity ($\Omega \times$ cm) | 25 | $10^{17}$ | $10^{17}$ |
|  | 100 | $10^{16}$ | $10^{16}$ |
|  | 150 | $10^{16}$ | $10^{16}$ |
| relative dielectric constant | 25 | 3.66 | 3.48 |
|  | 100 | 3.66 | 3.48 |
|  | 150 | 3.65 | 3.45 |

EXAMPLE 17

PEEKK containing additives of 0.1 % by weight of triphenylphosphate, 0.1% by weight of IRGAFOS 168 (Ciba-Geigy) and 0.1% by weight of HOSTAFLON TF 9202 (HOECHST AG) and having a melt flow index of 16 g/10 min was processed as in Example 1 to give a 200 μm thick amorphous film. Mechanical properties were measured immediately after production and again after storing the film for 18 months. During the storage period, the toughness of the film had not decreased, instead a slight gain in toughness was found.

|  | freshly extruded | after 18 months |
|---|---|---|
| modulus of elasticity (GPa) | 2.4 | 2.6 |
| tensile strength at break (MPa) | 90 | 100 |
| elongation at break (%) | 160 | 164 |

EXAMPLE 18

PEEKK having a melt flow index of 11 g/10 min was melted in a single-screw extruder at temperatures of 370° C. to 385° C. and extruded onto a cooling drum kept at a temperature of 70° C., using electrostatic pinning. A 500 μm thick film was produced, which was yellow and transparent and had a density of 1.27 g/cm³.

EXAMPLE 19

PEEKK films of Examples 1 (220 μm) and 18 (500 μm) were formed into conical cups in a vacuum thermoforming unit. The mold used for this purpose had the following dimensions: depth 40 mm, diameter at upper rim 89 mm, diameter at bottom 73 mm.

The films were cut into squares of 180×180 mm, clamped into the apparatus and heated to 160° C. by means of infrared heating (heating time for 200 μm: 3 to 4 s; for 500 μm: 10 to 20 s) and then drawn into the mold by vacuum. In the process, the film was stretched 1.75 times in each direction at the bottom of the cup.

EXAMPLE 20

A thermoformed cup from Example 19 (produced from the thicker film) was filled with water and placed on a laboratory hot plate. The cup was heated (hot plate set at 300° C.) until the water boiled. The cup did not deform.

EXAMPLE 21

PEEKK having a melt flow index of 24 g/10 min and containing additives of 0.1% by weight of IRGAFOS PEPQ (Ciba-Geigy), 0.2% by weight of IRGANOX 1222 (Ciba-Geigy) and 0.1% by weight of octaphenylcyclotetrasiloxane was extruded into an amorphous film as in Example 1. The film had a density of 1.27 g/cm³; it had a brown color and was transparent. The mechanical properties were as follows:

| modulus of elasticity: | 2.6 GPa |
|---|---|
| tensile strength at break: | 111 MPa |
| elongation at break: | 180% |

EXAMPLE 22

PEEKK having a melt flow index of 13 g/10 min and containing additives of 0.1% by weight of IRGAFOS PEPQ, 0.2% by weight of IRGANOX 1222 and 0.1% by weight of calcium stearate was extruded into a 100 μm thick amorphous film as in Example 1. The film had a yellow color and was transparent. The following values of mechanical properties were measured:

| modulus of elasticity: | 2.6 GPa |
|---|---|
| tensile strength at break: | 140 MPa |
| elongation at break: | 220% |

What is claimed is:

1. A film of a thermoplastic, wholly aromatic polyetherketone, which is amorphous and comprises the polymer PEEKK which is formed of the following repeat unit:

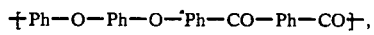

in which the Ph group denotes a para-phenylene group.

2. A film as claimed in claim 1, which has a density of $\leq 1.28$ g/cm³.

3. A film as claimed in claim 1, wherein the polyetherketone has a melt flow index in the range from about 1.0 to 1,000 g/10 min.

4. A film as claimed in claim 3, wherein said melt flow index is in the range from about 10 to 200 g/10 min.

5. A film as claimed in claim 1, which further comprises an effective amount of at least one selected from the group consisting of a processing aid, a winding aid, a stabilizer and a color pigment.

6. A film as claimed in claim 1, which further contains a lubricant in an amount from about 0 to 2 wt %.

7. A film as claimed in claim 6, wherein said lubricant is present in an amount from about 0.1 to 1.5 wt %.

8. A film as claimed in claim 6, wherein said lubricant is selected from the group consisting of calcium stearate, a PTFE wax and a polydiorganosiloxane.

9. A process for producing a molded article which comprises the steps of:
   (a) providing a film of a thermoplastic, wholly aromatic polyetherketone, which is amorphous and comprises the polymer PEEKK which is formed of the following repeat unit:

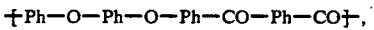

in which the group Ph denotes a para-phenylene group,
   (b) heating said film to a temperature sufficient for molding, and
   (c) molding said film to produce a molded article.

10. A process as claimed in claim 9, further comprising the step of (d) cooling said article at a rate sufficient to retain the amorphous state of said film, whereby an amorphous molded article is produced.

11. A process as claimed in claim 10, wherein said article is cooled to room temperature.

12. An amorphous molded article produced by a process as claimed in claim 10.

13. A process as claimed in claim 9, further comprising the step of (d) maintaining said article at a temperature above about 170° C. for a time sufficient to convert the amorphous state of said film to a crystalline state, whereby a crystalline molded article is produced.

14. A crystalline molded article produced by a process as claimed in claim 13.

15. A molded article comprising a film as claimed in claim 1.

16. An electrical insulating material comprising a film as claimed in claim 1.

* * * * *